US011126558B2

(12) United States Patent
Kao et al.

(10) Patent No.: US 11,126,558 B2
(45) Date of Patent: Sep. 21, 2021

(54) DATA STORAGE DEVICE AND CONTROL METHOD FOR NON-VOLATILE MEMORY

(71) Applicant: Silicon Motion, Inc., Jhubei (TW)

(72) Inventors: Wei-Lin Kao, Changzhi Township, Pingtung County (TW); Yang-Chih Shen, Taoyuan (TW); Jian-Yu Chen, Taichung (TW)

(73) Assignee: SILICON MOTION, INC., Jhubei (TW)

(*) Notice: Subject to any disclaimer, the term of this patent is extended or adjusted under 35 U.S.C. 154(b) by 27 days.

(21) Appl. No.: 16/728,294

(22) Filed: Dec. 27, 2019

(65) Prior Publication Data

US 2020/0272570 A1 Aug. 27, 2020

Related U.S. Application Data

(60) Provisional application No. 62/810,422, filed on Feb. 26, 2019.

(30) Foreign Application Priority Data

Aug. 8, 2019 (TW) ................................. 108128179

(51) Int. Cl.
*G06F 12/08* (2016.01)
*G06F 12/0882* (2016.01)
(Continued)

(52) U.S. Cl.
CPC .......... *G06F 12/0882* (2013.01); *G06F 9/546* (2013.01); *G06F 12/0292* (2013.01); *G06F 12/0873* (2013.01); *G06F 13/1668* (2013.01)

(58) Field of Classification Search
CPC ............ G06F 12/0882; G06F 12/0873; G06F 13/1668; G06F 12/0292; G06F 9/546
(Continued)

(56) References Cited

U.S. PATENT DOCUMENTS 5,319,778 A 6/1994 Catino
7,587,427 B2 9/2009 Satou et al.
(Continued)

FOREIGN PATENT DOCUMENTS

TW 201413453 A 4/2014
TW 201439772 A 10/2014
(Continued)

OTHER PUBLICATIONS

Non-Final Office Action dated Nov. 9, 2020, issued in U.S. Appl. No. 16/585,583.
(Continued)

*Primary Examiner* — Hua J Song
(74) *Attorney, Agent, or Firm* — McClure, Qualey & Rodack, LLP

(57) ABSTRACT

A high-performance data storage device is disclosed. A controller updates a sub mapping table on the temporary storage in response to a write command of the non-volatile memory issued by a host. The mapping sub-table corresponds to a logical group involved in the write command and is downloaded from the non-volatile memory. When the mapping sub-table has not been completely downloaded to the temporary storage memory, the controller pushes the write command to a waiting queue to avoid dragging the performance of the data storage device.

12 Claims, 6 Drawing Sheets

(51) Int. Cl.
*G06F 12/0873* (2016.01)
*G06F 9/54* (2006.01)
*G06F 13/16* (2006.01)
*G06F 12/02* (2006.01)

(58) Field of Classification Search
USPC .......................................................... 711/154
See application file for complete search history.

(56) References Cited

U.S. PATENT DOCUMENTS

| | | | |
|---|---|---|---|
| 8,112,574 B2 | 2/2012 | Lee et al. | |
| 9,268,706 B2 | 2/2016 | Kunimatsu et al. | |
| 9,383,927 B2 | 7/2016 | Thomas | |
| 9,460,025 B1 | 10/2016 | Wallace et al. | |
| 9,529,731 B1 | 12/2016 | Wallace et al. | |
| 10,635,358 B2 | 4/2020 | Hsiao et al. | |
| 10,810,123 B1 | 10/2020 | Xu | |
| 2003/0204702 A1 | 10/2003 | Lomax, Jr. et al. | |
| 2010/0077136 A1 | 3/2010 | Ware et al. | |
| 2012/0166723 A1 | 6/2012 | Araki et al. | |
| 2014/0032818 A1 | 1/2014 | Chang et al. | |
| 2014/0082265 A1 | 3/2014 | Cheng | |
| 2014/0181415 A1 | 6/2014 | Loh et al. | |
| 2014/0223071 A1 | 8/2014 | Bert et al. | |
| 2014/0223079 A1* | 8/2014 | Zhang ................. G06F 12/0246 711/103 |
| 2015/0339058 A1 | 11/2015 | Yoshii et al. | |
| 2016/0004642 A1 | 1/2016 | Sugimoto et al. | |
| 2016/0124649 A1* | 5/2016 | Liu .......................... G06F 3/061 711/103 |
| 2016/0291878 A1 | 10/2016 | Kang | |
| 2017/0083451 A1* | 3/2017 | Tan ..................... G06F 12/0246 |
| 2017/0308396 A1 | 10/2017 | Hsieh | |
| 2018/0196747 A1 | 7/2018 | Tang | |
| 2019/0057038 A1 | 2/2019 | Haswell | |
| 2019/0227931 A1 | 7/2019 | Jung | |
| 2019/0310944 A1 | 10/2019 | Rudoff et al. | |
| 2020/0264984 A1 | 8/2020 | Adams et al. | |

FOREIGN PATENT DOCUMENTS

| | | |
|---|---|---|
| TW | 1521343 B | 2/2016 |
| TW | 201712549 A | 4/2017 |
| TW | 201810017 A | 3/2018 |
| TW | 201826126 A | 7/2018 |
| TW | 1660346 B | 5/2019 |

OTHER PUBLICATIONS

Non-Final Office Action dated Nov. 30, 2020, issued in U.S. Appl. No. 16/573,409.

"What is Bit Masking?;" Stack Overflow; Nov. 2016; pp. 1-4; http://web.archive.org/web/20161126111540/https://stackoverflow.com/questions/10493411/what-is-bit-masking.

* cited by examiner

DATA STORAGE DEVICE AND CONTROL METHOD FOR NON-VOLATILE MEMORY

CROSS REFERENCE TO RELATED APPLICATIONS

This Application claims the benefit of U.S. Provisional Application No. 62/810,422, filed on Feb. 26, 2019, the entirety of which is incorporated by reference herein.

This Application also claims priority of Taiwan Patent Application No. 108128179, filed on Aug. 8, 2019, the entirety of which is incorporated by reference herein.

BACKGROUND OF THE INVENTION

Field of the Invention

The present invention is related to data storage devices, and in particular it is related to the management of mapping information of a data storage device.

Description of the Related Art

There are various forms of non-volatile memory (NVM) for long-term data storage, such as flash memory, magnetoresistive random access memory (RAM), ferroelectric RAM, resistive RAM, spin transfer torque-RAM (STT-RAM), and so on. These non-volatile memories may be used as the storage medium in a data storage device.

Non-volatile memory typically has particular storage characteristics. The technical field needs to develop corresponding control technology.

BRIEF SUMMARY OF THE INVENTION

A data storage device in accordance with an exemplary embodiment of the present invention includes a non-volatile memory, a controller, a temporary storage, and a waiting queue. The controller updates a sub mapping table on the temporary storage in response to a write command of the non-volatile memory issued by a host. The sub mapping table corresponds to a logical group involved in the write command and is downloaded from the non-volatile memory. When the sub mapping table has not been completely downloaded to the temporary storage, the controller uses the waiting queue to queue the write command to avoid dragging the performance of the data storage device.

In an exemplary embodiment, the controller acquires the write command from a command queue. The write command is pushed to the command queue by the host.

Before completely downloading the sub mapping table to the temporary storage, the controller uses the temporary storage to cache write data issued by the write command and returns a completion element to be queued in a completion queue. Based on the completion element queued in the completion queue, the host transfers a subsequent command queued in the command queue to the controller.

After completely downloading the sub mapping table to the temporary storage, the controller acquires the write command from the waiting queue. According to the write command, the controller programs the write data cached in the temporary storage to the non-volatile memory.

Before acquiring the write command from the waiting queue, the controller executes the subsequent command.

In an exemplary embodiment, the controller is in dual core architecture. The controller executes the subsequent command when downloading the sub mapping table to the temporary storage.

Before completely downloading the sub mapping table to the temporary storage, the controller cleans the temporary storage by uploading data from the temporary storage to the non-volatile memory to release a space of the temporary storage to cache write data issued by the write command. After caching the write data issued by the write command, the controller returns a completion element to be queued in a completion queue. Based on the completion element queued in the completion queue, the host transfers a subsequent command queued in the command queue to the controller. After completely downloading the sub mapping table to the temporary storage, the controller acquires the write command from the waiting queue and, according to the write command, the controller programs the write data cached in the temporary storage to the non-volatile memory. Before acquiring the write command from the waiting queue, the controller executes the subsequent command.

The aforementioned controller may be implemented in other architectures. In an exemplary embodiment, a non-volatile memory control method based on the foregoing concept, including the following steps: updating a sub mapping table on the temporary storage in response to a write command of the non-volatile memory issued by a host, wherein the sub mapping table corresponds to a logical group involved in the write command and is downloaded from the non-volatile memory; and using a waiting queue to queue the write command before the sub mapping table is completely downloaded to the temporary storage.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows exemplary embodiments of carrying out the invention. This description is made for the purpose of illustrating the general principles of the invention and should not be taken in a limiting sense. The scope of the invention is best determined by reference to the appended claims.

A non-volatile memory for long-term data retention may be a flash memory, a magnetoresistive random access memory (RAM, a ferroelectric RAM, a resistive RAM, a spin transfer torque-RAM (STT-RAM) and so on. The following discussion uses flash memory as an example.

Today's data storage devices often use flash memory as the storage medium for storing user data from the host. There are many types of data storage devices, including memory cards, universal serial bus (USB) flash devices, solid-state drives (SSDs), and so on. In another exemplary embodiment, a flash memory may be packaged with a controller to form a multiple-chip package called eMMC (embedded multimedia card).

A data storage device using a flash memory as a storage medium can be applied in a variety of electronic devices, including a smartphone, a wearable device, a tablet computer, a virtual reality device, etc. A calculation module of an electronic device may be regarded as a host that operates a data storage device equipped on the electronic device to access a flash memory within the data storage device.

A data center may be built with data storage devices using flash memories as the storage medium. For example, a server may operate an array of SSDs to form a data center. The server may be regarded as a host that operates the SSDs to access the flash memories within the SSDs.

Figure 1:
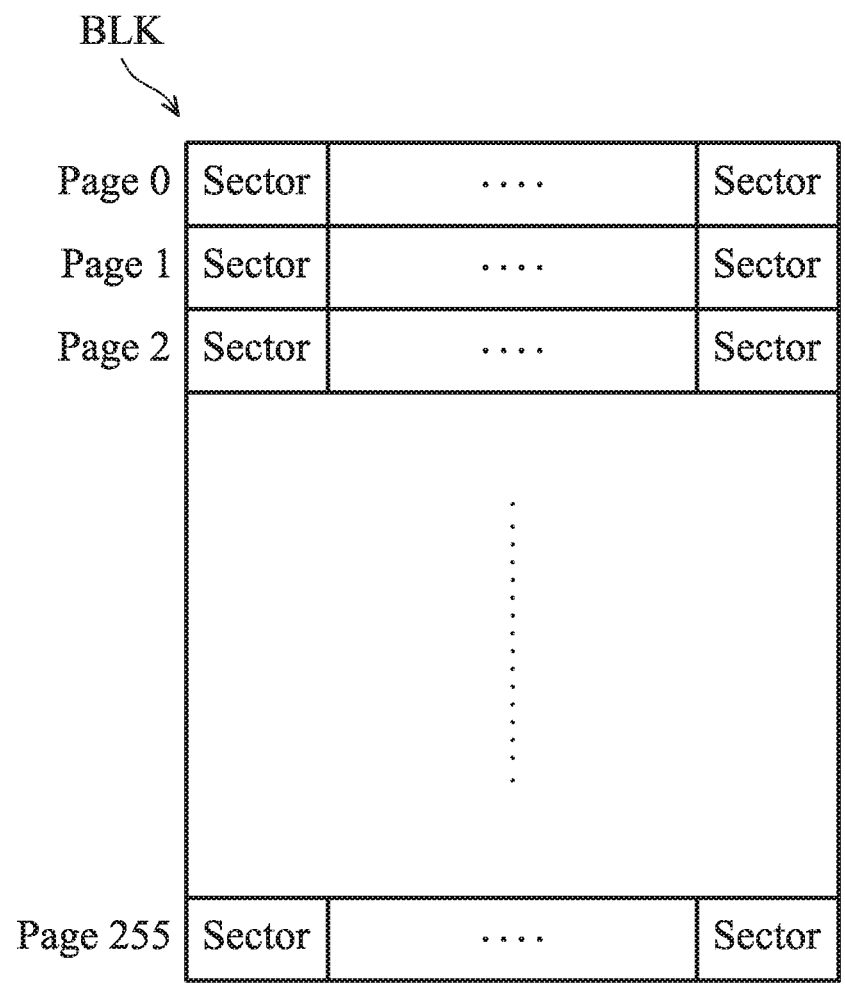
FIG. 1 illustrates the architecture of one block BLK.

The physical space of a flash memory is divided into a plurality of blocks. FIG. 1 illustrates the architecture of one block BLK, which includes a plurality of pages (e.g., page 0 to page 255). Each page includes a plurality of sectors (e.g., 32 sectors per page), each sector stores 512B user data. In a 4 KB management mode, each data unit covers 8 sectors. A 16 KB page stores four data units. In an exemplary embodiment, data units are programmed to the flash memory from low to high page number (e.g., from page 0 to page 255). In an exemplary embodiment, the data storage device adopts multi-channel technology, which regards several blocks accessed through the different channels as one super block, and treats pages among the different blocks as a super page. Storage space management is based on the super block/page concept to raise the data throughput of the data storage device.

Flash memory has its own particular storage characteristics. Instead of overwriting a space storing old data, a new version of data is saved in the spare space. The old data is marked as invalid. The sporadic valid data left in a block may be moved to a spare block by garbage collection. When only invalid data is contained in a block, the block can be released and an erase procedure can be performed on the block for the reuse of the block. The physical space of the flash memory is dynamically planned for use. At the host end, a logical address, e.g., a logical block address (LBA) or a global page number (GHP), is used to recognize the data. A logical-to-physical address mapping table L2P is required to map logical addresses to the physical space of the flash memory, showing which physical block, page and sector each logical address corresponds to.

Lots of flash memory operations need to refer to, or update the mapping information recorded in the L2P mapping table. Reading data (e.g., user data) from the flash memory may refer to the mapping information recorded in the L2P mapping table. Programming data to the flash memory may change the mapping information in the L2P mapping table. In addition to the read/write commands from the host or the garbage collection, other operations, such as space trimming or block data transfer, etc., may be performed on the flash memory. These operations may also refer to or change the mapping information in the L2P mapping table. To speed up the accessing of the L2P mapping table, the data storage device usually has a temporary storage (such as a DRAM).

However, with the increasing size of the flash memory, the management of the L2P mapping table becomes a burden. In an exemplary embodiment, each 4 KB data unit corresponds to a 4B physical address. 1 TB storage needs a 1 GB L2P mapping table, which is a large size table. The logical addresses may be divided into a plurality of logical address groups G# (# is a number) and, accordingly, the L2P mapping table is divided into a plurality of sub mapping tables L2P_G# (each corresponding to one logical address group G#). When being called by the core, the called sub mapping table L2P_G# is downloaded to the DRAM for reference or update. Compared to accessing the whole logical-to-physical address mapping table L2P, it is much easier to access just a sub mapping table L2P_G#.

Figure 2:
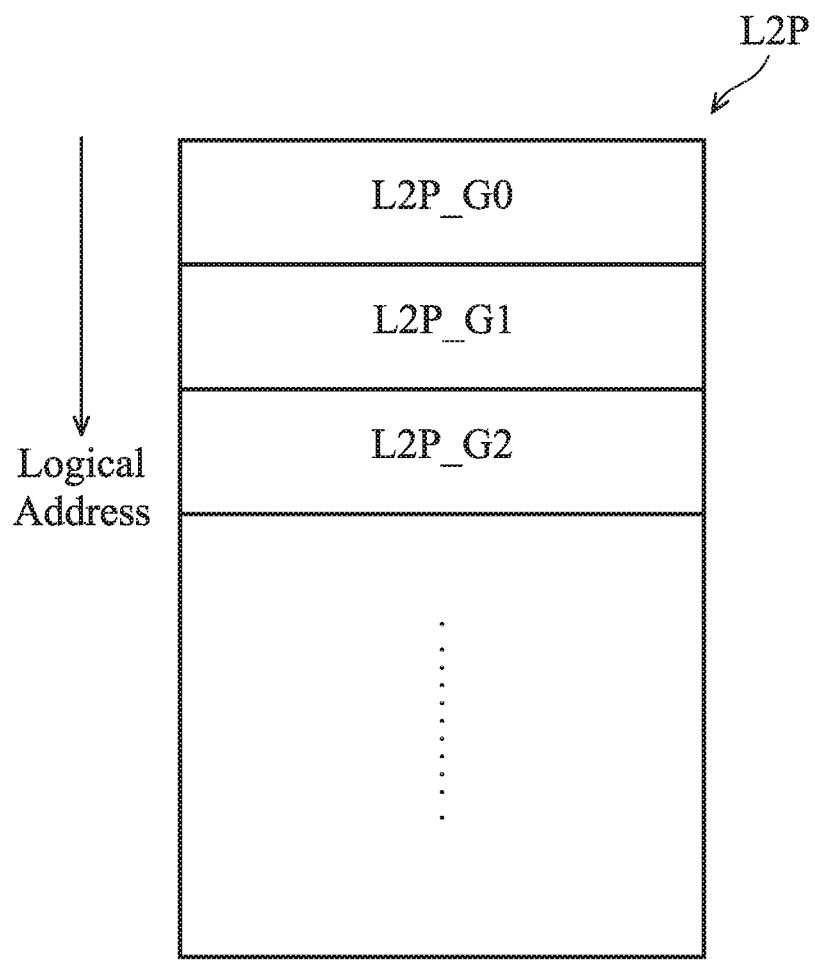
FIG. 2 illustrates sub mapping tables L2P_G#.

FIG. 2 illustrates sub mapping tables L2P_G#. In an exemplary embodiment, whole logical-to-physical address mapping table L2P is divided according to a fixed logical address. Each logical address group (G#) corresponds to one sub mapping table (L2P_G#).

To reduce the hardware cost, the data storage device may only be equipped with a small-sized DRAM. How to efficiently use the small-sized DRAM to manage (read, refer to, or update) the sub mapping tables L2P_G# is an important technical issue.

Figure 3:
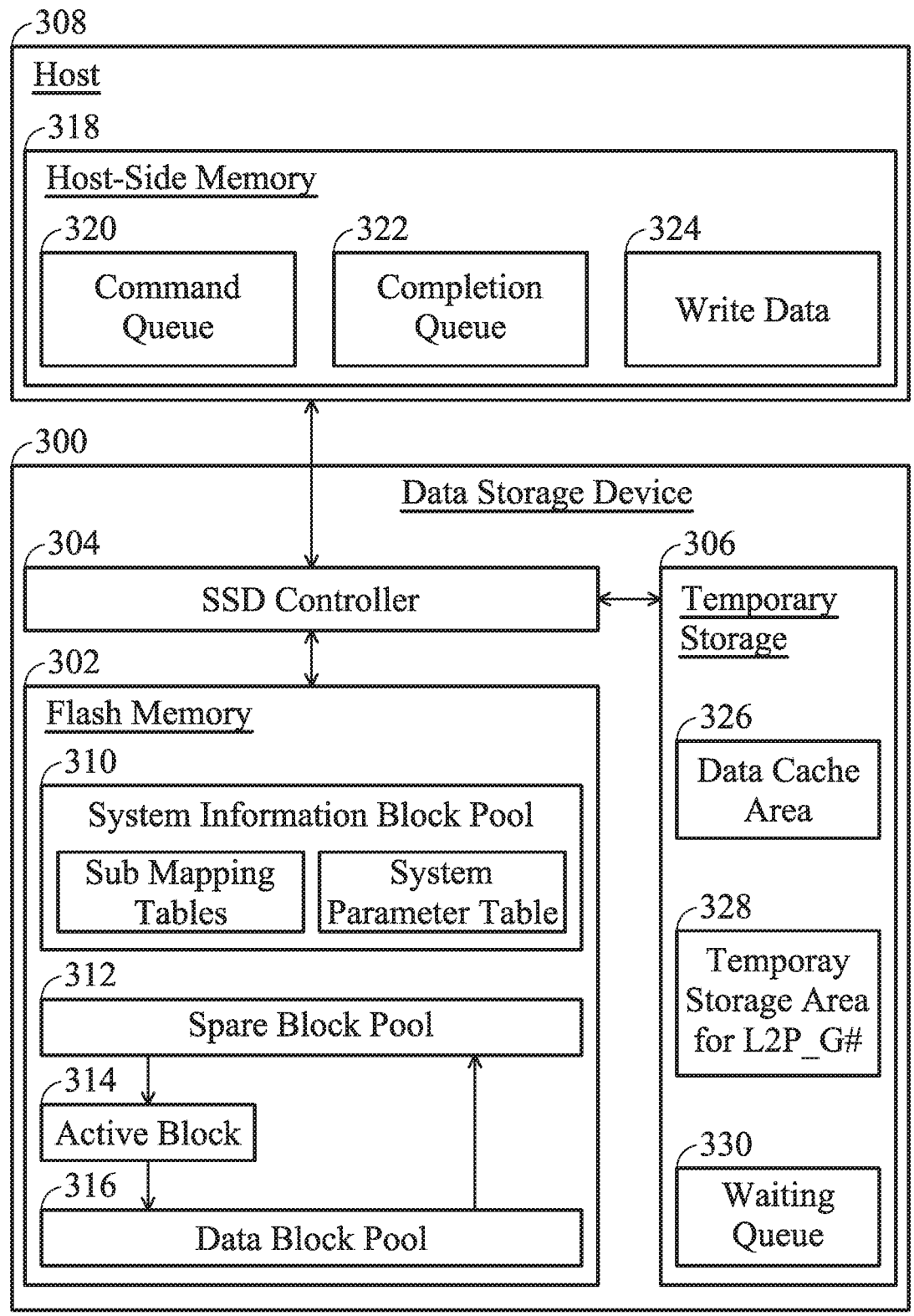
FIG. 3 is a block diagram illustrating a data storage device 300 in accordance with an exemplary embodiment of the present invention.

FIG. 3 is a block diagram illustrating a data storage device 300 in accordance with an exemplary embodiment of the present invention, including a flash memory 302, a solid-state drive (SSD) controller 304, and a temporary storage 306. A host 308 accesses the flash memory 302 through the SSD controller 304. The data storage device 300 may initiate optimization operations on the flash memory 302. For example, the SSD controller 304 may perform garbage collection, space trimming, block data transfer, and the like on the flash memory 302. The SSD controller 304 uses the temporary storage 306 to store temporary data which is required for the SSD controller 304 to control the flash memory 302. The temporary storage 306 may be a DRAM or an SRAM and is preferably placed outside the SSD controller 304 (not limited thereto).

The flash memory 302 has a pool 310 of system information blocks, e.g., storing all sub mapping tables L2P_G# and a system parameter table. From a spare block pool 312, an active block 314 is selected for the programming of write data issued by the host 308. After being closed (e.g., by the programming of EOB (end of block) information), the active block 314 is regarded as a data block and belongs to the data block pool 316. When all data within the data block is invalidated, the data block is released as a spare block and belongs to the spare block pool 312. In some exemplary embodiments, an active block is used as a destination block for garbage collection or block data transfer.

Note that in the data storage device 300, the write data (as known as user data) received from the host 308 is not directly programmed to the active block 314. The write data is cached in the temporary storage 306 first for the preparation of the corresponding sub mapping table L2P_G#. The sub mapping table L2P_G# is updated in the temporary storage 306 and the write data cached in the temporary storage 306 is programmed to the active block 314.

The host 308 plans a host-side memory 318 to include a command queue 320, a completion queue 322, and a temporary storage area for write data 324. The SSD controller 304 of the data storage device 300 plans the temporary storage 306 to include a data cache area 326 and a temporary storage area 328 for sub mapping tables (up to 16 sub mapping tables). In particular, the data storage device 300 further includes a waiting queue 330. The waiting queue 330 may be planned in the temporary storage 306 or within an internal static random access memory (SRAM) of the SSD controller 304.

Figure 4A:
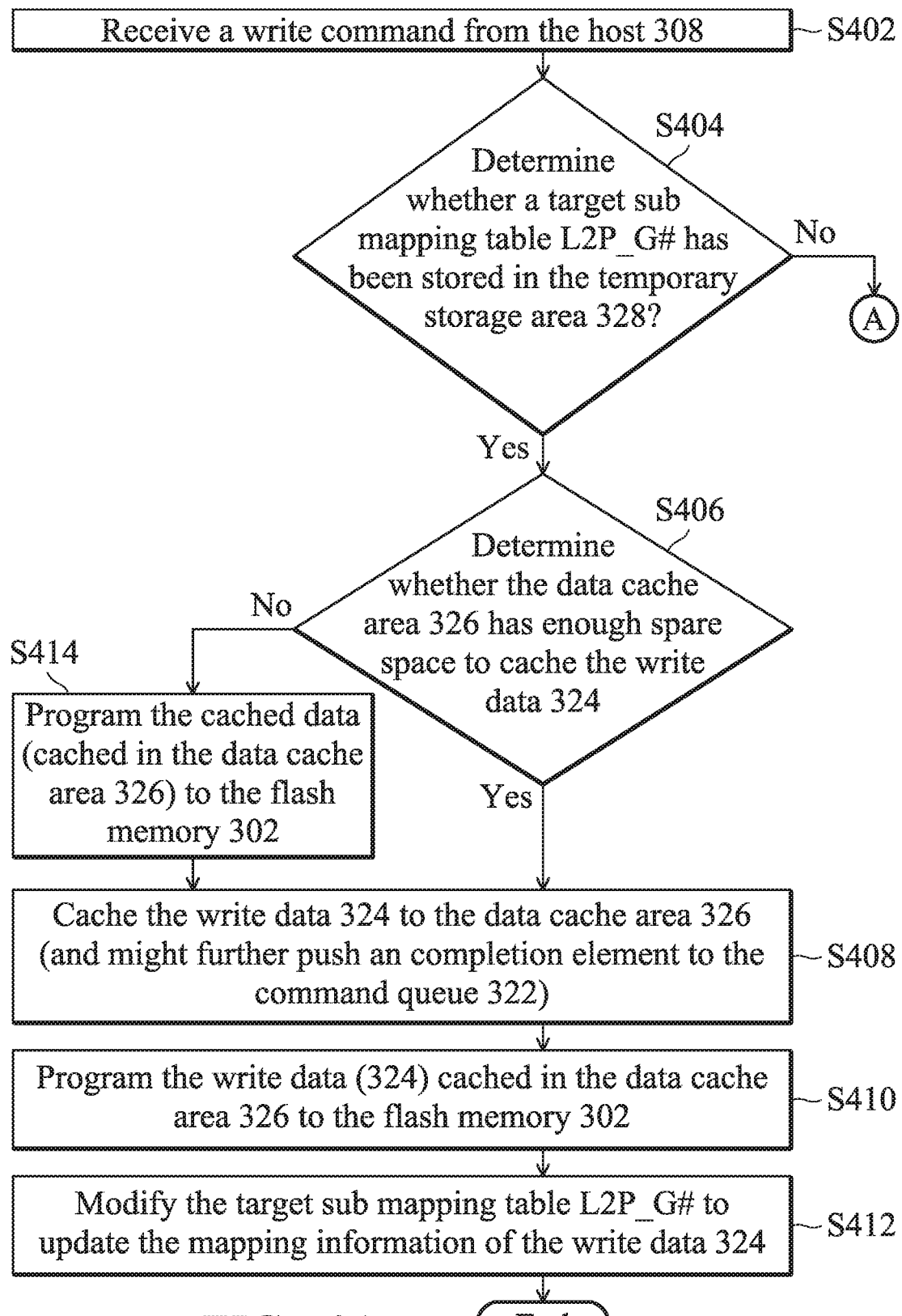
FIGS. 4A, 4B, and 4C show a flowchart depicting how the SSD controller 304 executes a write command from the host in accordance with an exemplary embodiment of the present invention.
Figure 4B:
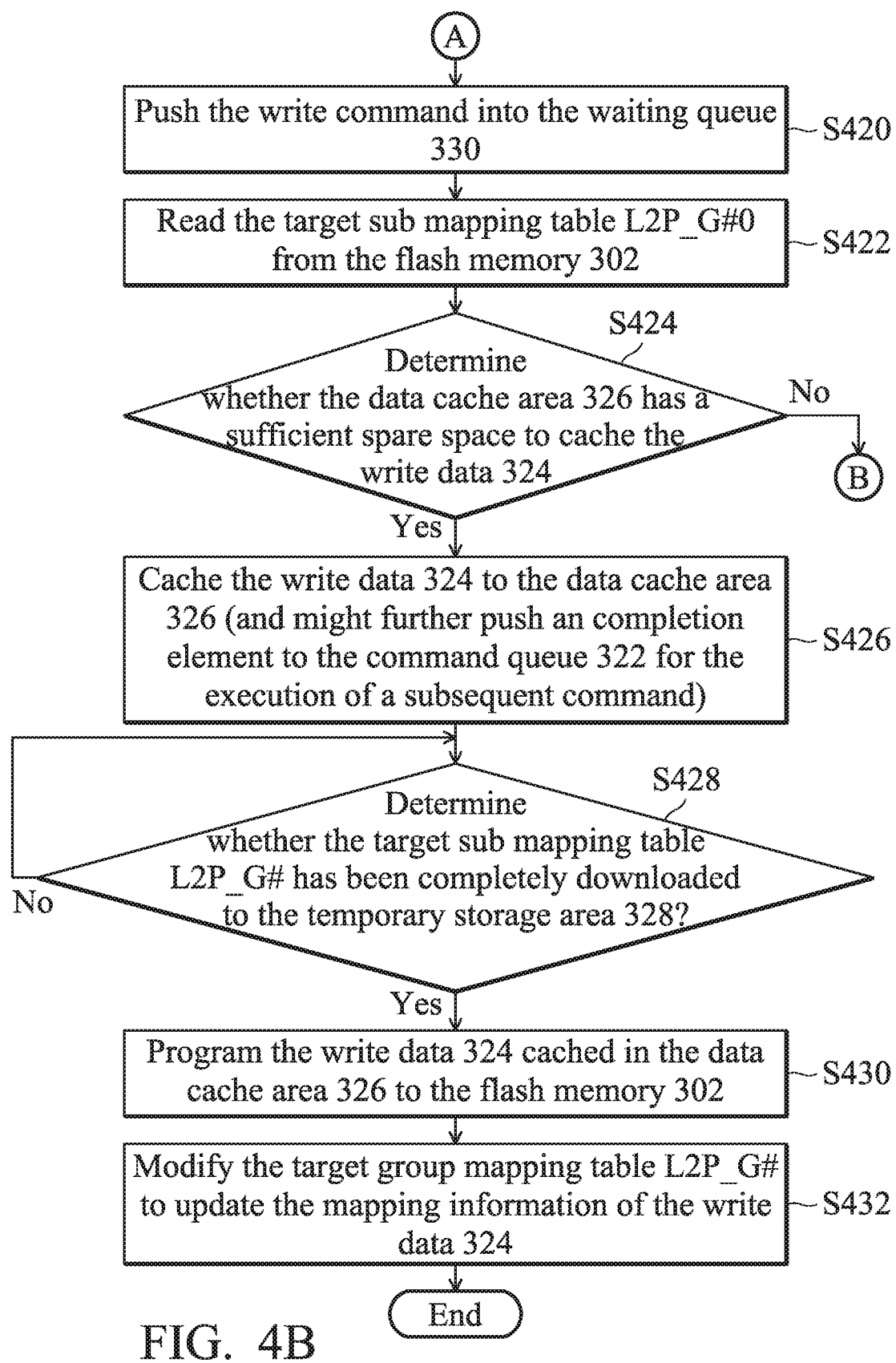
Figure 4C:
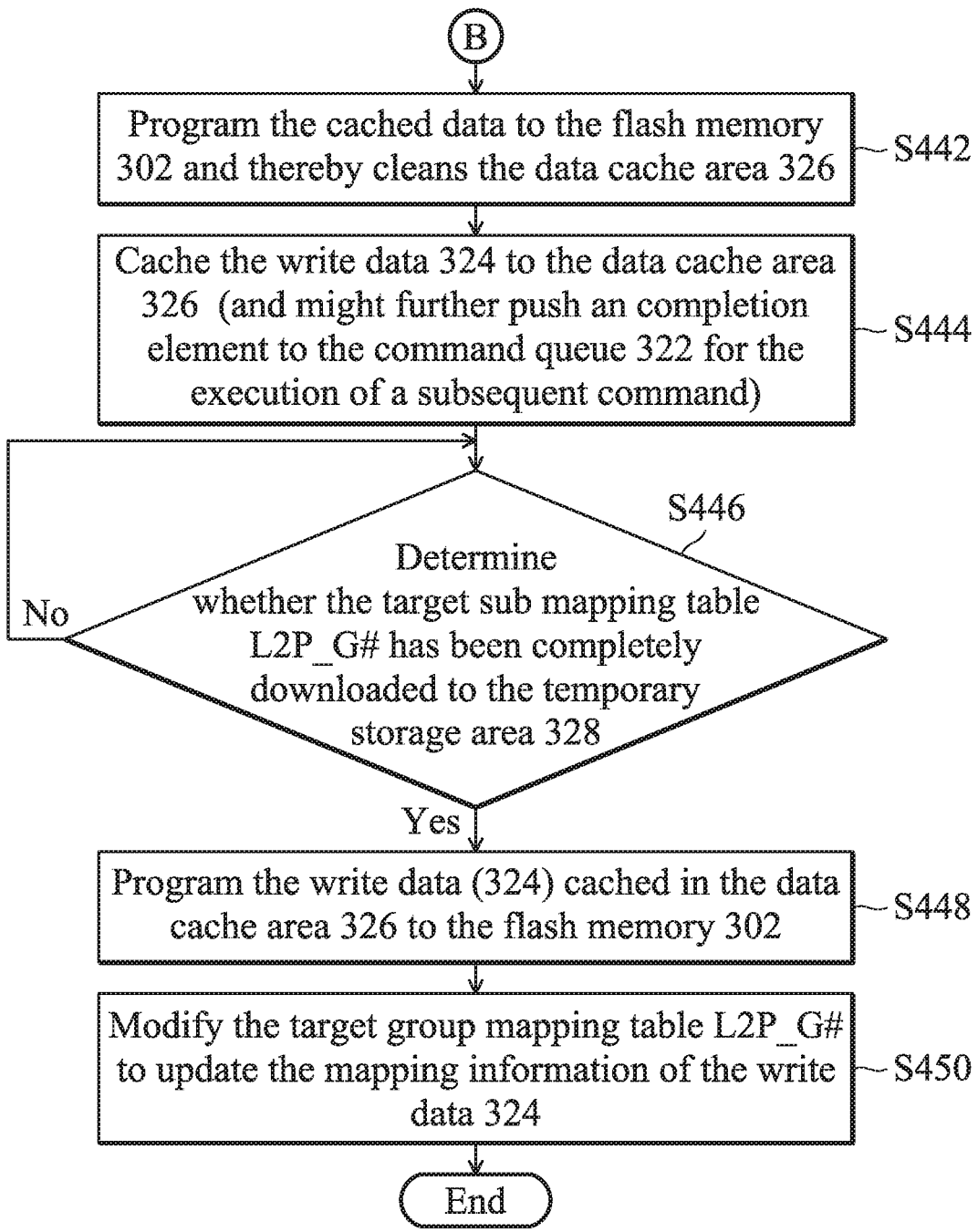

FIGS. 4A, 4B, and 4C show a flowchart depicting how the SSD controller 304 executes a write command from the host in accordance with an exemplary embodiment of the present invention. In step S402, the SSD controller 304 receives a write command from the host 308 which indicates the write data 324 and contains the LBA information of the write data 324. The write command is pushed to the command queue 320 by the host 308 waiting to be transferred the data storage device 300. The SSD controller 304 of the data storage device 300 acquires the write command from the command queue 320 and completes the reception of the write command. For example, the write command may request to write user data of LBA #1016 to #1023.

In step S404, the SSD controller 304 determines whether a target sub mapping table L2P_G# corresponding to the write data 324 has been stored in the temporary storage area 328. If yes, step S406 is performed. Otherwise, step S420 (FIG. 4B) is performed. For example, the mapping information of LBA #1016~#1023 is recorded in the sub mapping table L2P_G#0. The SSD controller 304 determines whether the target sub mapping table (i.e., L2P_G#0) has been stored in the temporary storage area 328. The SSD controller 304 may use a look-up table or a linked list to manage the contents temporarily stored in the temporary storage area 328, and thereby the searching of the target sub mapping table within the temporary storage area 328 is accelerated.

In step S406, the SSD controller 304 determines whether the data cache area 326 has enough spare space to cache the write data 324. If yes, step S408 is performed. If no, step S414 is performed. For example, each sector of user data LBA #1016 to LBA #1023 is 512B. A 4 KB cache space is required. The SSD controller 304 determines whether the data cache area 326 has a spare space larger than 4 KB in size.

In step S408, the SSD controller 304 caches the write data 324 to the data cache area 326. The SSD controller 304 obtains the user data LBA #1016~#1023 (e.g., the write data 324) from the host-side memory 318, and caches the user data 324 to the data cache area 326. In addition, the SSD controller 304 may fill in a completion element to the completion queue 322 when the user data 324 is completely cached. The host 408, therefore, regards that the execution of the write command is completed. The execution efficiency of the write command is high. After checking the contents of the completion element, the host 308 is allowed to transfer another write command to the SSD controller 304.

In step S410, the SSD controller 304 programs the write data (324) cached in the data cache area 326 to the flash memory 302. For example, the SSD controller 304 programs the user data LBAs #1016~#1023 cached in the data cache area 326 to the active block 314. In order to improve the efficiency of data programming, the SSD controller 304 may determine whether the number of the cached user data reaches a threshold amount, for example, 32 LBAs. If not, the SSD controller 304 continues to accumulate data in the data cache area 326. For example, step S402 is repeated.

In step S412, the SSD controller 304 modifies the target sub mapping table L2P_G# to update the mapping information of the write data 324. For example, the SSD controller 304 modifies the target sub mapping table L2P_G#0 to map the write data LBA#1016 to #1023 to the active block 314. In an exemplary embodiment, the completion element is pushed to the completion queue 322 after step S410 or after step S412 rather than in step S408. The sub mapping table L2P_G# stored in the temporary storage area 328 needs to be sealed to the system information block pool 310 for non-volatile storage.

In step S414, the SSD controller 304 programs the cached data (cached in the data cache area 326) to the flash memory 302. Data received from the host 308 but has not been programmed into the flash memory 302 is cached in the data cache area 326. When the data cache area 326 does not have a sufficient spare space, the SSD controller 304 programs the cached data to the flash memory. 302 to release the cache space.

When the determination made in step S404 is "No", the SSD controller 304 proceeds to the procedure of FIG. 4B.

In step S420, the SSD controller 304 pushes the write command into the waiting queue 330. Since the target sub mapping table (e.g., L2P_G#0) has not been downloaded to the temporary storage area 328, the SSD controller 304 pushes the write command into the waiting queue 330 to prepare the target sub mapping table L2P_G#0 and the user data LBA #1016 to #1023 in the temporary storage 306.

In an exemplary embodiment, the SSD controller 304 is a dual core (dual CPU) architecture. The first CPU is mainly responsible for the execution of host commands (e.g., the write command), and the second CPU is mainly responsible for the operations of the flash memory 302. Since the target sub mapping table L2P_G#0 has not been downloaded to the temporary storage area 328, the SSD controller 304 needs to read the target sub mapping table L2P_G#0 from the flash memory 302. The second CPU executes step S422 to read the target sub mapping table L2P_G#0 from the flash memory 302. Meanwhile, the first CPU may perform step S424, step S402, or other procedures. In other words, the SSD controller 304 does not need to pause to wait for the downloading of the target sub mapping table L2P_G#0. The SSD controller 304 can continue to perform the subsequent step S424, to execute the next write command, or to execute another procedure. In this manner, the data storage device 300 has high performance and efficiency.

In step S422, the SSD controller 304 downloads the target sub mapping table L2P_G#. The SSD controller 304 (e.g., the second CPU) may check a logical group to physical space mapping table G2F to get the physical address of the target sub mapping table L2P_G#0 and, accordingly, downloads the target sub mapping table L2P_G#0 from the flash memory 302 to the temporary storage area 328.

In step S424, the SSD controller 304 determines whether the data cache area 326 has a sufficient spare space to cache the write data 324 (similar to step S406). If yes, step S426 is performed. If not, step S442 of FIG. 4C is performed.

In step S426, the SSD controller 304 caches the write data 324 to the data cache area 326 (similar to step S408). The SSD controller 304 may fill in a completion element to the completion queue 322 right now to inform the host 308 that the next command is permitted to be transferred. After checking the contents of the completion queue 322, the host 308 may transfer another write command to the SSD controller 304. Alternatively, the SSD controller 304 may fill in the completion element to the completion queue 322 in a later process. As long as the host 308 is able to get the completion element corresponding to the write command earlier (which results in an earlier execution of a subsequent command), it is believed within the scope of the present invention.

In step S428, the SSD controller 304 determines whether the target sub mapping table L2P_G# corresponding to the write data 324 has been completely downloaded to the temporary storage area 328. If yes, step S430 is performed. If not, the SSD controller 304 keeps monitoring the downloading of the target sub mapping table L2P_G#. In this example, when the target sub mapping table L2P_G#0 has not been completely downloaded to the temporary storage area 328, the first CPU of the SSD controller 304 can still cope with other procedures requested by the host 308.

In step S430, the SSD controller 304 programs the write data 324 cached in the data cache area 326 to the flash memory 302.

In step S432, the SSD controller 304 modifies the target group mapping table L2P_G# to update the mapping information of the write data 324 (similar to step S412).

The write command queued in the waiting queue 330 can be completed even though the subsequent command is inserted and executed.

When the determination made in step S424 is 'NO', the SSD controller 304 proceeds to the flow of FIG. 4C.

In step S442, the data cache area 326 is cleaned. Similar to step S414, the SSD controller 304 programs the cached data to the flash memory 302 and thereby cleans the data cache area 326.

In step S444, the SSD controller 304 caches the write data 324 to the data cache area 326 (similar to step S408). The SSD controller 304 can fill in a completion element to the completion queue 322 right now to inform the host 308 that the next command is permitted to be transferred. After checking the contents of the completion queue 322, the host 308 may transfer another write command to the SSD controller 304. Alternatively, the SSD controller 304 may fill in the completion element to the completion queue 322 in a later process. As long as the host 308 is able to get the completion element corresponding to the write command earlier (which results in an earlier execution of a subsequent command), it is believed within the scope of the present invention.

In step S446, the SSD controller 304 determines whether the target sub mapping table L2P_G# corresponding to the write data 324 has been completely downloaded to the temporary storage area 328. If yes, step S448 is performed. If not, step S446 is performed again. Even though the target sub mapping table L2P_G# has not been completely downloaded to the temporary storage area 328 yet, the other requests from the host 308 can be processed by the first CPU of the SSD controller 304.

In step S448, the SSD controller 304 programs the write data (324) cached in the data cache area 326 to the flash memory 302.

In step S450, the SSD controller 304 modifies the target group mapping table L2P_G# to update the mapping information of the write data 324 (similar to step S412).

The write command queued in the waiting queue 330 can be completed even though the subsequent command is inserted and executed.

The SSD controller 304 controlling the flash memory 302 may be implemented in other architectures. Any techniques using the waiting queue 330 are in the scope of the present invention. In some exemplary embodiments, control methods for non-volatile memory may be realized based on the foregoing concept.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
   a non-volatile memory;
   a controller and a temporary storage; and
   a waiting queue;

wherein:
   the controller acquires a write command from a command queue, wherein the write command is pushed into the command queue by a host for programming write data to the non-volatile memory;
   the controller updates a sub mapping table on the temporary storage in response to the write command, wherein the sub mapping table corresponds to a logical group involved in the write command and is downloaded from the non-volatile memory;
   the controller uses the waiting queue to queue the write command before the sub mapping table is completely downloaded to the temporary storage;
   before completely downloading the sub mapping table to the temporary storage, the controller uses the temporary storage to cache the write data and returns a completion element to be queued in a completion queue; and
   based on the completion element queued in the completion queue, the host transfers a subsequent command queued in the command queue to the controller.

2. The data storage device as claimed in claim 1, wherein:
   after completely downloading the sub mapping table to the temporary storage, the controller acquires the write command from the waiting queue and, according to the write command, the controller programs the write data cached in the temporary storage to the non-volatile memory.

3. The data storage device as claimed in claim 2, wherein:
   before acquiring the write command from the waiting queue, the controller executes the subsequent command.

4. The data storage device as claimed in claim 3, wherein:
   the controller is in dual core architecture; and
   the controller executes the subsequent command when downloading the sub mapping table to the temporary storage.

5. The data storage device as claimed in claim 1, wherein:
   before completely downloading the sub mapping table to the temporary storage, the controller cleans the temporary storage by uploading data from the temporary storage to the non-volatile memory to release a space of the temporary storage to cache the write data.

6. The data storage device as claimed in claim 5, wherein:
   after completely downloading the sub mapping table to the temporary storage, the controller acquires the write command from the waiting queue and, according to the write command, the controller programs the write data cached in the temporary storage to the non-volatile memory; and
   before acquiring the write command from the waiting queue, the controller executes the subsequent command.

7. A method for controlling a non-volatile memory, comprising:
   acquiring a write command from a command queue, wherein the write command is pushed into the command queue by a host for programming write data to the non-volatile memory;
   updating a sub mapping table on a temporary storage in response to the write command, wherein the sub mapping table corresponds to a logical group involved in the write command and is downloaded from the non-volatile memory;

using a waiting queue to queue the write command before the sub mapping table is completely downloaded to the temporary storage; and before the sub mapping table is completely downloaded to the temporary storage, using the temporary storage to cache the write data and returning a completion element to be queued in a completion queue;

wherein based on the completion element queued in the completion queue, a subsequent command queued in the command queue is transferred from the host.

8. The method as claimed in claim 7, further comprising:

after completely downloading the sub mapping table to the temporary storage, acquiring the write command from the waiting queue; and according to the write command, programming the write data cached in the temporary storage to the non-volatile memory.

9. The method as claimed in claim 8, further comprising:

executing the subsequent command before acquiring the write command from the waiting queue.

10. The method as claimed in claim 9, further comprising:

providing hardware in a dual core architecture to execute the subsequent command while downloading the sub mapping table to the temporary storage.

11. The method as claimed in claim 7, further comprising:

before completely downloading the sub mapping table to the temporary storage, cleaning the temporary storage by uploading data from the temporary storage to the non-volatile memory to release a space of the temporary storage to cache the write data.

12. The method as claimed in claim 11, further comprising:

after completely downloading the sub mapping table to the temporary storage, acquiring the write command from the waiting queue;

according to the write command, programming the write data cached in the temporary storage to the non-volatile memory; and executing the subsequent command before acquiring the write command from the waiting queue.

* * * * *